(12) United States Patent
D'Souza et al.

(10) Patent No.: US 8,345,019 B2
(45) Date of Patent: Jan. 1, 2013

(54) METHOD AND APPARATUS FOR TWO-FINGER TOUCH COORDINATE RECOGNITION AND ROTATION GESTURE RECOGNITION

(75) Inventors: Henry M. D'Souza, San Diego, CA (US); Joel C. Kent, Fremont, CA (US)

(73) Assignee: Elo Touch Solutions, Inc., Menlo Park, CA (US)

( * ) Notice: Subject to any disclaimer, the term of this patent is extended or adjusted under 35 U.S.C. 154(b) by 574 days.

(21) Appl. No.: 12/389,996

(22) Filed: Feb. 20, 2009

(65) Prior Publication Data

US 2010/0214231 A1    Aug. 26, 2010

(51) Int. Cl.
*G06F 3/045* (2006.01)
(52) U.S. Cl. ........................................ 345/174
(58) Field of Classification Search .............. None
See application file for complete search history.

(56) References Cited

U.S. PATENT DOCUMENTS

| | | |
|---|---|---|
| 4,933,660 A | 6/1990 | Wynne, Jr. |
| 5,402,151 A | 3/1995 | Duwaer |
| 5,438,168 A | 8/1995 | Wolfe et al. |
| 5,563,381 A | 10/1996 | Crooks et al. |
| 5,861,583 A | 1/1999 | Schediwy et al. |
| 5,973,676 A | 10/1999 | Kawakura |
| 6,255,604 B1 | 7/2001 | Tokioka et al. |
| 6,492,979 B1 | 12/2002 | Kent |
| 6,593,916 B1 | 7/2003 | Aroyan |
| 6,958,749 B1 | 10/2005 | Matsushita et al. |
| 7,023,427 B2 | 4/2006 | Kraus et al. |
| 7,034,806 B2 | 4/2006 | Nakagawa |
| 7,180,508 B2 | 2/2007 | Kent et al. |
| 7,254,775 B2 | 8/2007 | Geaghan et al. |

(Continued)

FOREIGN PATENT DOCUMENTS

EP        0194861 A2     9/1986

(Continued)

OTHER PUBLICATIONS

Jorn Loviscach Ed—Association for Computing Machinery: "TwoFinger Input with a Standard Touch Screen" UIST 2007. Proceedings of the 20th Annual ACM Symposium on User Interface Software and Technology, Oct. 7 10, 2007, Newport, Rhode Island, USA; [ACM Symposium on User Interface Software and Technology], New York, NY; ACM, US Oct. 7, 2007, pp. 169-172.

(Continued)

*Primary Examiner* — Joseph Haley
(74) *Attorney, Agent, or Firm* — Alston & Bird LLP

(57) ABSTRACT

A resistive touchscreen system comprises a substrate, a coversheet and a controller. The coversheet comprises a first conductive coating and the substrate comprises a second conductive coating. The substrate and coversheet are positioned proximate each other such that the first conductive coating faces the second conductive coating, and the substrate and coversheet are electrically disconnected with respect to each other in the absence of a touch. The controller is configured to (a) identify a multiple touch state when the substrate and coversheet are electrically connected with respect to each other at at least two touch locations, (b) to detect, over time, a plurality of apparent touch coordinates, (c) identify two possible X coordinates and two possible Y coordinates associated with at least one of the apparent touch coordinates, and (d) identify coordinate locations of two touches based on the apparent touch coordinates and the two possible X and Y coordinates.

19 Claims, 6 Drawing Sheets

U.S. PATENT DOCUMENTS

| | | | |
|---|---|---|---|
| 7,265,686 B2 | 9/2007 | Hurst et al. | |
| 7,842,266 B2 * | 11/2010 | Takahashi et al. | 423/212 |
| 7,907,125 B2 * | 3/2011 | Weiss et al. | 345/173 |
| 2003/0063073 A1 | 4/2003 | Geaghan et al. | |
| 2005/0046621 A1 | 3/2005 | Kaikuranta | |
| 2005/0076824 A1 | 4/2005 | Cross et al. | |
| 2005/0110772 A1 | 5/2005 | Kong et al. | |
| 2006/0025218 A1 | 2/2006 | Hotta | |
| 2006/0026536 A1 * | 2/2006 | Hotelling et al. | 715/863 |
| 2007/0085553 A1 | 4/2007 | Keroe et al. | |
| 2007/0285404 A1 * | 12/2007 | Rimon et al. | 345/173 |
| 2009/0189877 A1 * | 7/2009 | Washino et al. | 345/174 |
| 2009/0322700 A1 | 12/2009 | D'Souza et al. | |
| 2009/0322701 A1 | 12/2009 | D'Souza et al. | |
| 2010/0066701 A1 * | 3/2010 | Ningrat | 345/174 |

FOREIGN PATENT DOCUMENTS

| | | |
|---|---|---|
| EP | 0309946 A2 | 4/1989 |
| EP | 0745953 A2 | 12/1996 |
| EP | 0773496 A1 | 5/1997 |
| JP | 5-265632 | 10/1993 |
| JP | 9-160709 A | 6/1997 |
| JP | 2000-105645 A | 4/2000 |
| JP | 2007-122522 | 5/2007 |
| JP | 2009-146191 A | 7/2009 |
| WO | WO-92/10823 A1 | 6/1992 |

OTHER PUBLICATIONS

International Search Report for International Application No. PCT/US2010/000278 (counterpart to the above-identified U.S. Appl. No. 12/389,996), mailed Feb. 20, 2010.

International Search Report for International Application No. PCT/US2009/003836, mailed Jul. 1, 2010.

Horowitz, P., The Art of Electronics, Jan. 1, 1989, Cambridge Univ. Press, pp. 280-285.

Horowitz, P., The Art of Electronics, Jan. 1, 1989, Cambridge Univ. Press, pp. 88-91.

* cited by examiner

METHOD AND APPARATUS FOR TWO-FINGER TOUCH COORDINATE RECOGNITION AND ROTATION GESTURE RECOGNITION

BACKGROUND OF THE INVENTION

This invention relates generally to touchscreen systems and more particularly to resistive touchscreen systems.

Resistive touchscreens are used for many applications, including small hand-held applications such as mobile phones and personal digital assistants. When a user touches the resistive touchscreen with two fingers, creating two touch points or dual touch, conventional systems report a single point somewhere between the two touch points as the selected point. In some systems, the transition to a multiple touch state may be detected by a sudden shift in measured coordinates from the first location to a new location. However, an ambiguity may arise between whether a single touch occurred that simply moved rapidly to a different location and whether a multiple touch state occurred.

In another conventional system, sheet bias current or bias load resistance is utilized to indicate a transition from a one touch state to a two or more touch state. The system identifies four corners of a rectangle that is located about the reported single point, but the system is unable to determine which of two opposite corners of the rectangle constitute the true touch coordinates. Also, the system is unable to determine whether more than two actual touches are present.

The identification of the locations of two simultaneous touches is useful in various applications, for example to interact with data being displayed, such as graphics and photos, or with programs, such as when playing music. For example, the ability to use two simultaneous touches to accomplish two-finger gestures such as zoom and rotate would increase the interactive capability the user has with resistive touchscreen systems.

Hence, a need exists for touchscreen systems and methods that are able to detect and identify locations of two simultaneous touches.

BRIEF DESCRIPTION OF THE INVENTION

In one embodiment, a resistive touchscreen system comprises a substrate, a coversheet and a controller. The coversheet comprises a first conductive coating and the substrate comprises a second conductive coating. The substrate and the coversheet are positioned proximate each other such that the first conductive coating faces the second conductive coating, and the substrate and coversheet are electrically disconnected with respect to each other in the absence of a touch. The controller is configured to identify a multiple touch state when the substrate and coversheet are electrically connected with respect to each other at at least two touch locations. The controller is further configured to detect, over time, a plurality of apparent touch coordinates and to identify two possible X coordinates and two possible Y coordinates associated with at least one of the apparent touch coordinates. The controller is further configured to identify coordinate locations of two touches based on the apparent touch coordinates and the two possible X coordinates and the two possible Y coordinates.

In another embodiment, a method for identifying coordinate locations of two touches on a resistive touchscreen system comprises identifying a multiple touch state on a touchscreen based on a decrease in at least one of X and Y bias load resistance values. At least N consecutive apparent touch coordinates are identified. When the at least N consecutive apparent touch coordinates are determined to generally define a line segment, coordinate locations of two touches that lie along the line segment are identified. The coordinate locations are based on the X and Y bias load resistance values and the apparent touch coordinates.

DETAILED DESCRIPTION OF THE INVENTION

Figure 1:
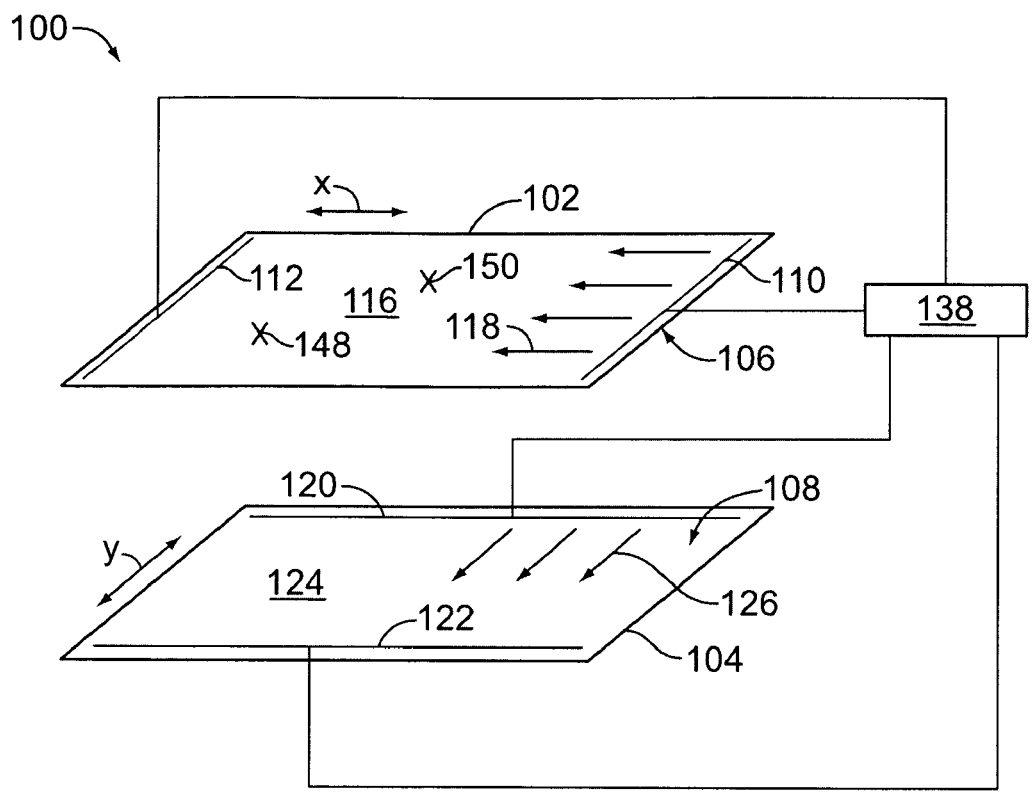
FIG. 1 illustrates a 4-wire resistive touchscreen system formed in accordance with an embodiment of the present invention.

The foregoing summary, as well as the following detailed description of certain embodiments of the present invention, will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like). Similarly, the programs may be stand alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

At least one embodiment of the invention is compatible with at least one of 3-wire, 4-wire, 5-wire, 7-wire, 8-wire and 9-wire resistive touchscreen sensors and/or systems of conventional design. A large number of 4-wire touchscreens are used in handheld devices. Therefore, the 4-wire touchscreen is primarily discussed below.

FIG. 1 illustrates a 4-wire resistive touchscreen system 100. The touchscreen system 100 has a coversheet 102 that is placed over a substrate 104 with a narrow air gap therebetween. The coversheet 102 may be a polymer film such as polyethylene terephthalate (PET) and the substrate 104 may comprise glass. Other materials may be used. In the absence of a touch, spacers (not shown) prevent contact between the coversheet 102 and substrate 104.

First and second conductive coatings 106 and 108 are formed on the facing surfaces of the coversheet 102 and substrate 104, respectively, exposed to the air gap. The first and second conductive coatings 106 and 108 may be transparent and may be formed of materials such as indium tin oxide (ITO), transparent metal film, carbon nanotube containing film, conductive polymer, or other conductive material. At left and right sides (or opposite sides) of the first conductive coating 106 are provided a first set of electrodes 110 and 112. Similarly, a second conductive coating 108 is provided with a second set of electrodes 120 and 122 that are oriented perpendicular with respect to the first set of electrodes 110 and 112. In another embodiment, the first and second sets of electrodes may be positioned at other angles with respect to each other. Each of the first and second conductive coatings 106 and 108 has an associated resistance measured between the respective electrodes. For example, a resistance associated with the first conductive coating 106 may be measured between the first set of electrodes 110 and 112, and a resistance associated with the second conductive coating 108 may be measured between the second set of electrodes 120 and 122. The resistance between the first set of electrodes 110 and 112 and the resistance between the second set of electrodes 120 and 122 may be referred to as "bias load resistances" as the resistances are load resistances over which a bias voltage is applied to produce voltage gradients for coordinate measurements.

When no touch is present, the first conductive coating 106 of the coversheet 102 and the second conductive coating 108 of the substrate 104 are electrically disconnected with respect to each other. The bias load resistance associated with a conductive coating is a reference value that constitutes the resistance of the conductive coating. In one embodiment, the resistances of the first and second conductive coatings 106 and 108 may be in the range of 400-600 Ohms, and may differ between the coversheet 102 and the substrate 104 due to differences in coating resistivity as well as touch area aspect ratio. In another embodiment, different materials, or different thickness of the same material, may be used to form the first and second conductive coatings 106 and 108, which may result in different resistance values.

To detect an X coordinate associated with one touch, such as touch 148 or touch 150, controller 138 applies a voltage difference across the first set of electrodes 110 and 112 of the first conductive coating 106 of the coversheet 102. For example, a positive voltage may be applied to electrode 110 while electrode 112 is grounded, thus establishing a voltage gradient in a first direction 118. In another embodiment, different levels of voltage may be applied to the electrodes 110 and 112. The voltage on the first conductive coating 106 at a touch location (e.g. the touch 148) is transmitted to the second conductive coating 108 and hence to electrodes 120 and 122. The controller 138 measures the X coordinate by measuring the voltage at either electrode 120 or 122. In this case, the resistance between electrodes 110 and 112 is the load resistance of the voltage applied to bias the first conductive coating 106 for an X coordinate measurement. Therefore, the resistance between electrodes 110 and 112 may be referred to as the "X bias load resistance."

To detect a Y coordinate associated with the one touch (e.g. the touch 148), controller 138 applies a voltage difference across the second set of electrodes 120 and 122 of second conductive coating 108 of the substrate 104, thus establishing a voltage gradient in a second direction 126. The voltage on the second conductive coating 108 at the touch location (e.g. the touch 148) is transmitted to the first conductive coating 106 and hence to electrodes 110 and 112. The controller 138 measures the Y coordinate by measuring the voltage at either electrode 110 or 112. As shown in FIG. 1, the resistance between electrodes 120 and 122 is the "Y bias load resistance."

During operation, the controller 138 may bias the first set of electrodes 110 and 112 in a first cycle and the second set of electrodes 120 and 122 in a second cycle. A touch causes the coversheet 102 to deflect and contact the substrate 104, thus making a localized electrical connection between the first and second conductive coatings 106 and 108. The controller 138 measures one voltage in one direction in the first cycle and another voltage in the other direction in the second cycle. These two voltages are the raw touch (x, y) coordinate data. Various calibration and correction methods may be applied to identify the actual (X, Y) display location within touch sensing areas 116 and 124. For example, corrections may be used to correct linear and/or non-linear distortions.

Figure 2:
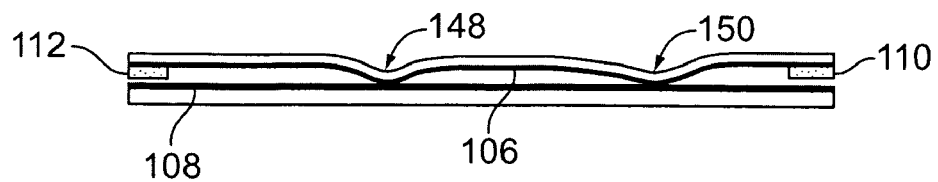
FIG. 2 illustrates a cross-section side view of the touchscreen of FIG. 1 formed in accordance with an embodiment of the present invention.

FIG. 2 illustrates an embodiment wherein the two touches 148 and 150 are present at the same time, herein also referred to as two simultaneous touches. The two simultaneous touches are present at the same point in time but are not necessarily synchronized. Therefore, one touch may be present prior to the second touch being present. Two simultaneous touches occur when contact is made between the first conductive coating 106 and the second conductive coating 108 at two locations, such as at the touches 148 and 150, at the same time. (A single touch occurs when contact is made between the first conductive coating 106 and the second conductive coating 108 at one location, such as at either touch 148 or 150. A multiple touch state occurs when contact is made between the first conductive coating 106 and the second conductive coating 108 at two or more locations.)

During the first cycle in which electrodes 110 and 112 in contact with the first conductive coating 106 are biased, the voltage transmitted to electrodes 120 and 122 of second conductive coating 108 is an intermediate voltage indicating a coordinate on the first conductive coating 106 that is located between the touches 148 and 150. For example, the above transmitted voltage may be measured at the electrode 120 or the electrode 122, or the electrodes 120 and 122 may be electrically connected when the voltage is measured. Thus, the resulting measured X coordinate will be at an intermediate value between the coordinate locations of the touches 148 and 150. Likewise, when two touches are present, the measured Y coordinate will be an intermediate value between the coordinate locations measured for each touch individually. For example, two simultaneous touches result in measured (X, Y) coordinates that are located on a line segment between the two actual touch locations. The measured (X, Y) coordinates are referred to herein as apparent touch coordinates.

Figure 3:
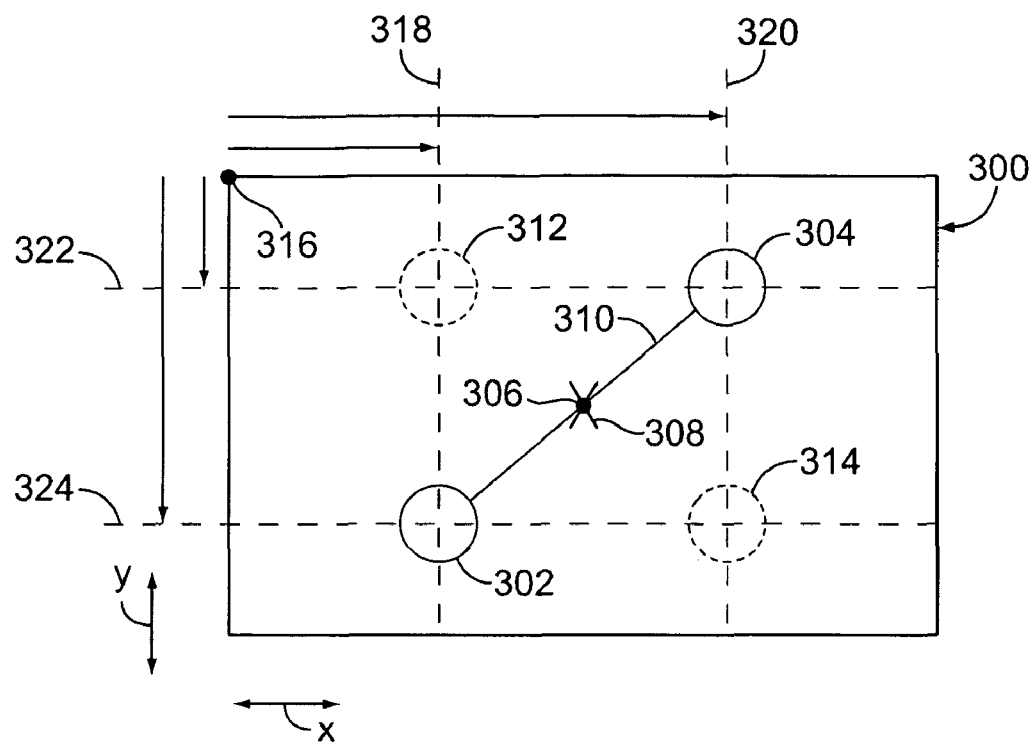
FIG. 3 illustrates two simultaneous touches on a touchscreen formed in accordance with an embodiment of the present invention.

FIG. 3 illustrates two simultaneous touches on a touchscreen 300. A first circle represents a first touch 302 at location ($X_1$,$Y_1$) and a second circle represents a second touch 304 at location ($X_2$,$Y_2$). A solid dot represents a center point or centroid 306 between the first and second touches 302 and 304 that is located along line segment 310. Apparent touch coordinates 308 are represented by the "x" symbol and are also located along the line segment 310.

When the circumstances creating the two touches 302 and 304 are the same, such as having equal areas of contact and equal pressure on the touchscreen 300, and thus having equal contact resistance, both touches 302 and 304 have equal electrical influence. Hence, the apparent touch coordinates 308 are equal to or approximate the centroid 306 of the line segment 310 between the two touches 302 and 304 as shown in FIG. 3. It should be understood that factors other than area of contact and amount of pressure may create differences in the contact resistance between the touches 302 and 304.

However, when the area of electrical contact or pressure applied at the second touch 304 is different than for the first touch 302, the contact resistances for the two touches will be different. For example, when the area of electrical contact at the second touch 304 is smaller than the area of electrical contact at the first touch 302, a respectively larger contact resistance results at the second touch 304. The second touch 304 therefore has less electrical influence than the first touch 302 and the apparent touch coordinates 308 are located closer to the first touch 302 than the second touch 304 along the line segment 310. Therefore, any variation in contact resistance in either of the first or second touches 302 and 304 will cause the apparent touch coordinates 308 to vary slightly along or jitter along the line segment 310. The variance or jitter may also be referred to as scatter.

When the apparent touch coordinates 308 are reported and the touches 302 and 304 are present simultaneously, the touchscreen system does not know if the real, i.e. true or actual, touches are located at touches 302 and 304 or at coordinate locations 312 and 314. In some embodiments, the coordinate locations 312 and 314 may be referred to as ghost touch positions. The X and Y bias load resistance values indicate an amount of separation between the two touches, but do not identify the direction (e.g. positive or negative X and Y coordinate directions) that the touches are located in with respect to the apparent touch coordinates 308. Therefore, the touchscreen system needs to be able to resolve the ambiguity in order to correctly identify the true touch coordinates.

For example, the touchscreen 300 may have an origin 316. It should be understood that the origin location is exemplary. Based on the X and Y bias load resistance values and the apparent touch coordinate 308, the controller 138 may determine possible X and Y coordinates with respect to the origin 316. For example, one possible X coordinate 318 may be located along a line shown extending through the first touch 302 and the coordinate location 312, and another possible X coordinate 320 may be located along a line shown extending through the second touch 304 and the coordinate location 314. Similarly, the controller 138 may determine that one possible Y coordinate 322 may be located along a line shown extending through the second touch 304 and the coordinate location 312, and another possible Y coordinate 324 may be located along a line shown extending through the first touch 302 and the coordinate location 314. Therefore, two possible X coordinates 318 and 320 and two possible Y coordinates 322 and 324 may be determined based on the apparent touch coordinate 308. In some embodiments, additional possible X and Y coordinates may be determined based on additional apparent touch coordinates.

Figure 4:
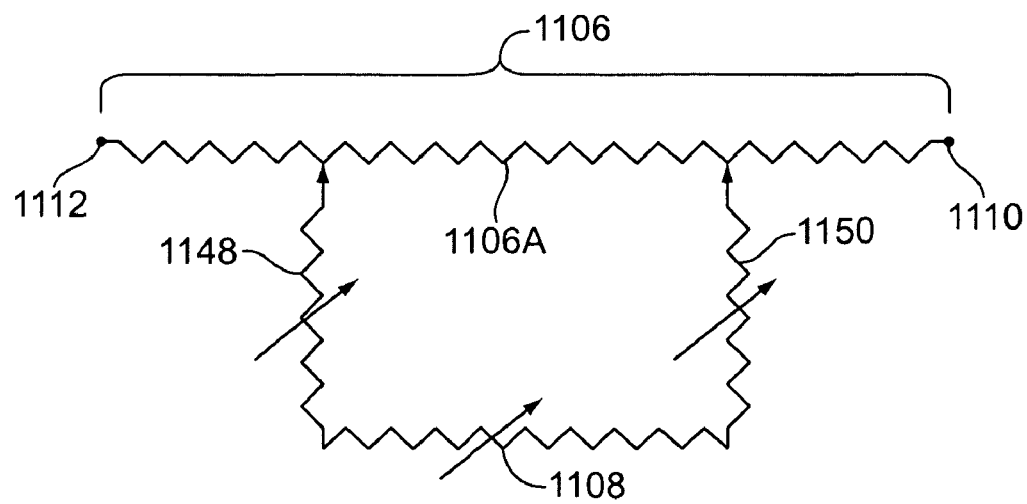
FIG. 4 illustrates an equivalent circuit representing electrical connections between electrodes on the coversheet when two touches are present on the touchscreen of FIG. 1 in accordance with an embodiment of the present invention.

FIG. 4 shows an exemplary equivalent circuit for the touchscreen of FIGS. 1 and 2. The two touches 148 and 150 result in two points or locations of electrical contact between the first conductive coating 106 of the coversheet 102 and the second conductive coating 108 of the substrate 104 as shown in FIG. 2. Associated with the touch 148 is a contact resistance 1148 in the equivalent circuit shown in FIG. 4, and likewise contact resistance 1150 is associated with the touch 150. Furthermore, there is a resistance 1108 of the second conductive coating 108 between the touches 148 and 150 as well as a resistance 1106A of the first conductive coating 106 between the two touches 148 and 150.

In the absence of any touches on the coversheet 102, there is a resistance 1106 between electrodes 110 and 112 (shown in FIG. 4 as circuit nodes 1110 and 1112) of the first conductive coating 106. When touches 148 and 150 are present, the resistance between electrodes 110 and 112 is altered because of the added current path through resistance 1108 and contact resistances 1148 and 1150 in parallel to the current path through resistance 1106A. This addition of a parallel resistance decreases the net resistance between electrodes 110 and 112. If only one touch is present, for example at either touch 148 or 150, no parallel resistance path is created and the resistance between electrodes 110 and 112 is the same as when no touches are present. Here it is assumed that electrodes 120 and 122 of the second conductive coating 108 are either floating or connected to a high impedance voltage sensing circuit, and hence to a good approximation do not draw or source any current. Thus a drop in resistance between electrodes 110 and 112 signals a transition from a zero or one touch state to a multiple touch state with two or more touches. In other words, a drop in the coversheet bias load resistance between electrodes 110 and 112 signals a transition to a multiple touch state. As shown in the configuration of FIG. 1, the coversheet bias load resistance is the X bias load resistance.

Likewise, a drop in the substrate bias load resistance (e.g. Y bias load resistance) also signals a transition to a multiple touch state. The "substrate bias load resistance" is the resistance between electrodes 120 and 122 on the substrate 104 when the coversheet electrodes 110 and 112 are floating or connected to a high impedance voltage sensing circuit. In one embodiment, it may be desirable to detect a transition to a multiple touch state by monitoring both of the substrate and coversheet bias load resistances. Referring to FIG. 2, if the voltages at touch 148 and touch 150 are equal, there will be no voltage difference to drive a current through the added resistance path and hence no change in the bias load resistance. This circumstance happens for the X bias load resistance when the touches 148 and 150 have the same X coordinate and happens for the Y bias load resistance when the touches 148 and 150 have the same Y coordinate. However, two distinct touches 148 and 150 cannot have the same X coordinate and the same Y coordinate simultaneously, and hence there is a drop in at least one of the two bias load resistances. Therefore, monitoring both X and Y bias load resistances reliably distinguishes between a single-touch (or no touch) state and a multiple touch state.

As discussed in FIG. 3, any changes in either of the contact resistances 1148 and 1150, such as due to changes in pressure or area of electrical contact, will cause the X and Y bias load resistance values measured between the electrodes 110 and 112 and the electrodes 120 and 122 to vary. These changes result in variance or jitter in the apparent touch coordinates 308.

Bias load resistance may be measured in a number of ways. Ohm's Law states that the voltage difference "V" across a resistance equals the current "I" through the resistance times the resistance "R" itself, namely V=IR. Ohm's Law may also be stated as R=V/I, and thus if the voltage and current through a resistance are known, so is the resistance. For example, if a known voltage is applied across the bias load resistance, a measurement of the resulting current flow constitutes a measurement of the bias load resistance value. Therefore, a transition to a multiple touch state may also be detected by measuring X and Y current values and identifying that one or both of the X and Y current values have increased.

In some embodiments, there is no need to determine the value of bias load resistance in units of Ohms. Accordingly, the measurement of the bias load resistance is to be broadly interpreted and may be accomplished using a variety of methods. For example, measuring a current value, such as with current measuring circuitry (not shown), and measuring a voltage drop across the bias load resistance are examples of measuring the bias load resistance.

Figure 5:
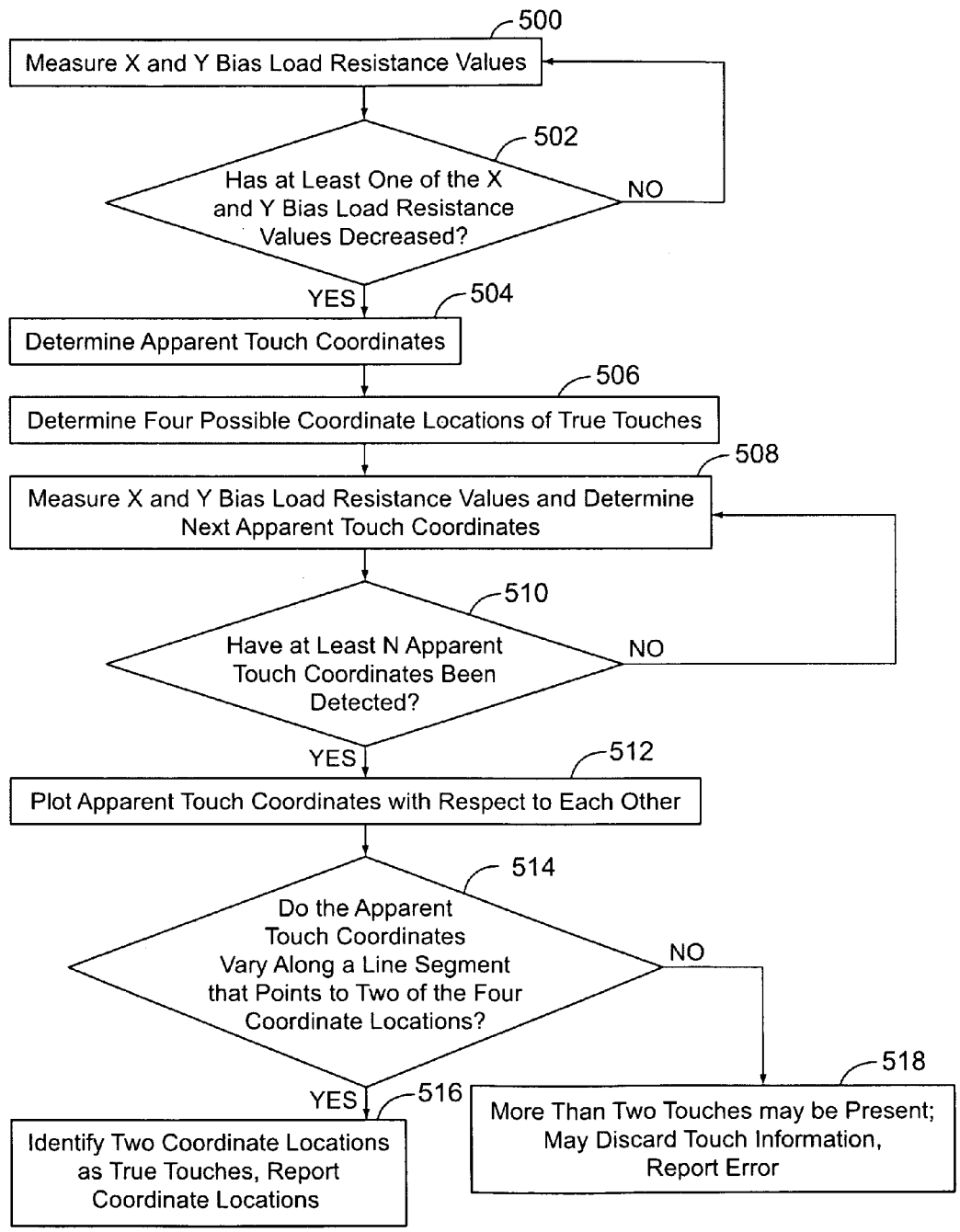
FIG. 5 illustrates a method for determining the coordinate locations of two simultaneous touches on the touchscreen system in accordance with an embodiment of the present invention.
Figure 6:
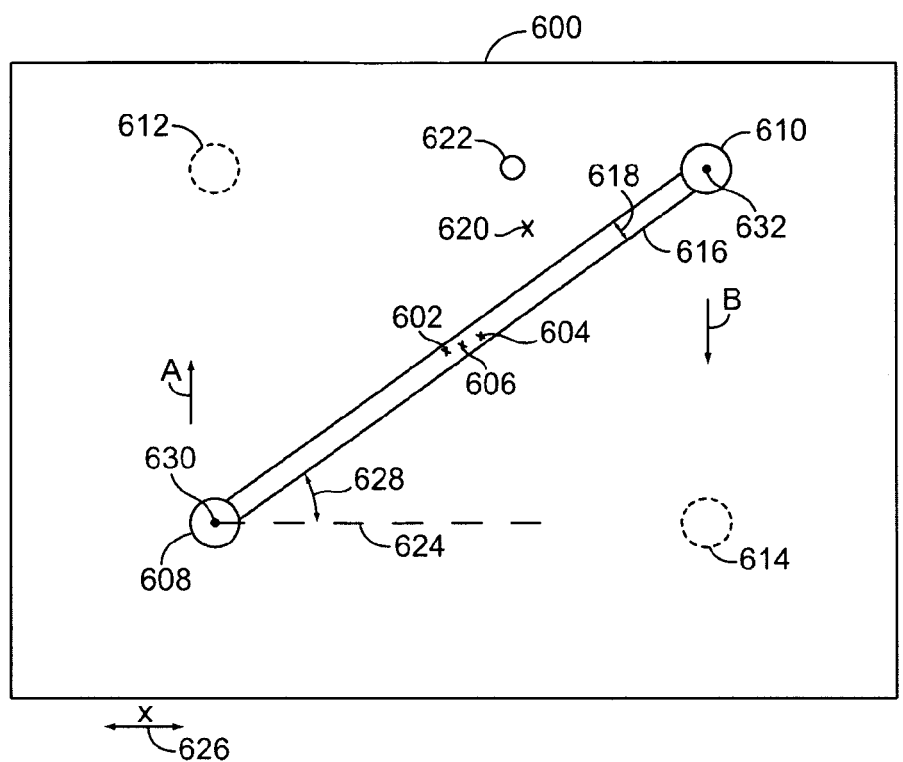
FIG. 6 illustrates a touchscreen that has two simultaneous touches in accordance with an embodiment of the present invention.

FIG. 5 illustrates a method for determining the coordinate locations of actual touches on the touchscreen system 100 when two simultaneous touches are detected. FIG. 6 illustrates a touchscreen 600 that has two simultaneous touches. FIGS. 5 and 6 will be discussed together.

At 500 the controller 138 detects or measures the X and Y bias load resistance values. In other embodiments, as discussed above, the controller 138 may detect the X and Y current values or the X and Y voltage values. At 502 the controller 138 determines whether at least one of the X and Y bias load resistance values has decreased, indicating that the substrate 104 and the coversheet 102 are electrically connected with respect to each other at a series of coordinate locations. In one embodiment, the X and Y bias load resistance values may be compared to a threshold. If the value is below the threshold, a multiple touch state has occurred. If yes, a multiple touch state has occurred and the method passes to 504. In another embodiment, if at least one of the X and Y current values has increased, such as above a threshold, the controller 138 determines that a multiple touch state has occurred.

At 504 the controller 138 determines the location of apparent touch coordinates 602 (as indicated on FIG. 6 with the "x" symbol) based on, for example, conventional voltage sensing methods. Other methods may be used. At 506 the controller 138 determines four possible coordinate locations of true touches based on the X and Y bias load resistance values and the apparent touch coordinate 602. As discussed previously, in multiple touch states, the X and Y bias load resistance values indicate a separation of the actual touch points. For example, two pairs of touches, such as at coordinate locations 608 and 610 and at coordinate locations 612 and 614 may be determined.

At 508 the controller 138 again detects or measures the X and Y bias load resistance values and determines the next apparent touch coordinate 604. At 510 the controller 138 determines whether at least N apparent touch coordinates have been detected. In one embodiment, N may be at least two. In another embodiment, the controller 138 may detect apparent touch coordinates for a minimum period of time, such as may be measured in milliseconds. In one embodiment, apparent touch coordinates may be detected for approximately a tenth of a second. The apparent touch coordinates may also be referred to as consecutive apparent touch coordinates. If more apparent touch coordinates are to be detected, the method returns to 508. In one embodiment, the method may return to 506, and in another embodiment, the method may also continually check that the multiple touch state is occurring, as was accomplished at 500 and 502. If at least N apparent touch coordinates have been detected, the method passes from 510 to 512 where the controller 138 plots and/or compares the consecutively acquired apparent touch coordinates with respect to each other.

For example, FIG. 6 shows apparent touch coordinates 602, 604 and 606. The apparent touch coordinates 602 may have been detected first, then apparent touch coordinates 604, and then apparent touch coordinates 606. In one embodiment, the apparent touch coordinates 602, 604 and 606 have been acquired consecutively with respect to each other. As the user touches the touchscreen 600, any minor variation in touch pressure impacts the contact resistance at each touch. The minor variations of contact resistance result in corresponding minor variations in the apparent touch coordinates 602, 604 and 606.

At 514 the controller 138 determines whether the apparent touch coordinates, such as the apparent touch coordinates 602-606, vary along or generally define a line segment 616 that connects or points to two of the four possible coordinate locations 608, 610, 612 and 614. The line segment 616 may have a width or thickness 618 that may be defined by or measured in, for example, numbers of pixels or coordinates or any other suitable scaled coordinate that may be measured in distance. In one embodiment, the thickness 618 may be a function of the distance between the two points, such as the two coordinate locations 608 and 610. The thickness 618 accommodates small changes in the coordinate locations, for example due to electronic noise or small amounts of motion that may not be intended, of the apparent touch coordinates as the user presses on the coversheet 102.

If the apparent touch coordinates generally define a line segment 616, at 516 the controller 138 identifies the true, i.e. actual, touches. In the example of FIG. 6, the true touches correspond to the two coordinate locations 608 and 610. The controller 138 may then activate buttons or accomplish various actions associated with the identified true touch coordinate locations. In one embodiment, the controller 138 may send, transmit, report or otherwise provide information, such as X and Y coordinates, for each of the two touches to another controller, processor, operating system, system interface, and the like (all not shown), which may then take further action based on the X and Y coordinates. In another embodiment, a display controller (not shown) may receive information identifying the locations of the two touches from the controller 138. The display controller may display dots 630 and 632 or other indications on, for example, a display positioned behind the touchscreen 600 or separate from the touchscreen 600, to indicate the true touch coordinate locations. The controller 138 may continue to determine whether the multiple touch state is still occurring and/or verifying that the apparent touch coordinates continue to vary along the line segment 616.

Returning to 514, the controller 138 may determine that the apparent touch coordinates vary in a random manner rather than along the line segment 616. For example, apparent touch coordinates 620 as shown in FIG. 6 do not vary along, and thus do not generally define, the line segment 616. In one embodiment, the controller 138 may compare differences between apparent touch coordinates to a threshold (e.g. pixels or a scaled version of coordinates). If at least one of the differences is greater than the threshold, then at least one of the apparent touch coordinates has varied beyond the line segment 616. This may be an indication of one or more additional touch, such as at coordinate location 622. Therefore, at 518 the controller 138 may determine that more than two touches are present. In one embodiment, the controller 138 may discard the touch information or report that an error has occurred.

It should be understood that the method(s) in FIG. 5 may be repeated, such as to continuously determine and plot the apparent touch coordinates with respect to each other and/or to identify differences there-between. Reasonable variations of the method, such as loops that acquire additional data and retest, such as to confirm previous results, are contemplated. Optionally, the method in FIG. 5 may be iterative to check or track that the correct touch assignments of the touches have been made.

Once the line segment 616 and the coordinate locations 608 and 610 of the true touches have been determined, the controller 138 may monitor the apparent touch coordinates and the X and Y bias load resistance values to identify clockwise (CW) and counter-clockwise (CCW) rotation movements of the coordinate locations 608 and 610, corresponding to CW and CCW rotation gestures, respectively. For example, the controller 138 may determine a slope of the line segment 616. In one embodiment, the slope may be determined as an angle with respect to one side of the touchscreen 600. Referring to FIG. 6, a dotted line 624 is shown parallel to X-axis 626 of the touchscreen 600. The controller 138 may thus determine angle 628 as the angle between the line segment 616 and the dotted line 624. It should be understood that other methods of determining the slope of the line segment 616, or of determining a trend of the changes in the apparent touch coordinates, may be used.

The controller 138 may monitor the slope or trend of the line segment 616 over time to determine changes in the slope. For example, changes in the slope may be indicated by a continual increase or decrease in the angle 628, indicating a movement trend in one direction. The controller 138 also monitors the X and Y bias load resistance values for changes. For example, if one of the X and Y bias load resistance values is increasing over time while the other value is decreasing over time, the controller 138 may couple this information with information regarding the trend of changes in the slope to determine whether the user is doing a CW or CCW rotation gesture.

For example, if the user is doing a CW rotation gesture, the contact resistance at each of the two touches will vary as the user moves their fingers along the coversheet 102, resulting in the apparent touch coordinates varying or jittering along a line segment that has a slope that is changing in one direction. Referring to FIG. 6, the controller 138 may detect that the angle 628 is decreasing over time. Simultaneously, one of the consecutively detected X and Y bias load resistance values is decreasing over time while the other is increasing over time. Because the angle 628 is decreasing and based on changes in the X and Y bias load resistances, the controller 138 can determine that the touch at coordinate location 608 is moving generally in the direction of arrow A and the touch at coordinate location 610 is moving generally in the direction of arrow B, and thus identifies the CW rotation gesture. The controller 138 may then activate some action based on the CW rotation gesture, such as rotating a graphic or picture currently being displayed.

In another embodiment, the controller 138 may identify a rotation gesture based on changes in the slope of the line segment 616 combined with confirmation that more than one touch is still present. For example, in some applications it may not be necessary to track the exact locations of the touches on the touchscreen 600 once the initial coordinate locations of the touches have been identified. Therefore, the controller 138 may activate a CW or CCW rotate command based on the change in the slope of the line segment 616.

Figure 7:
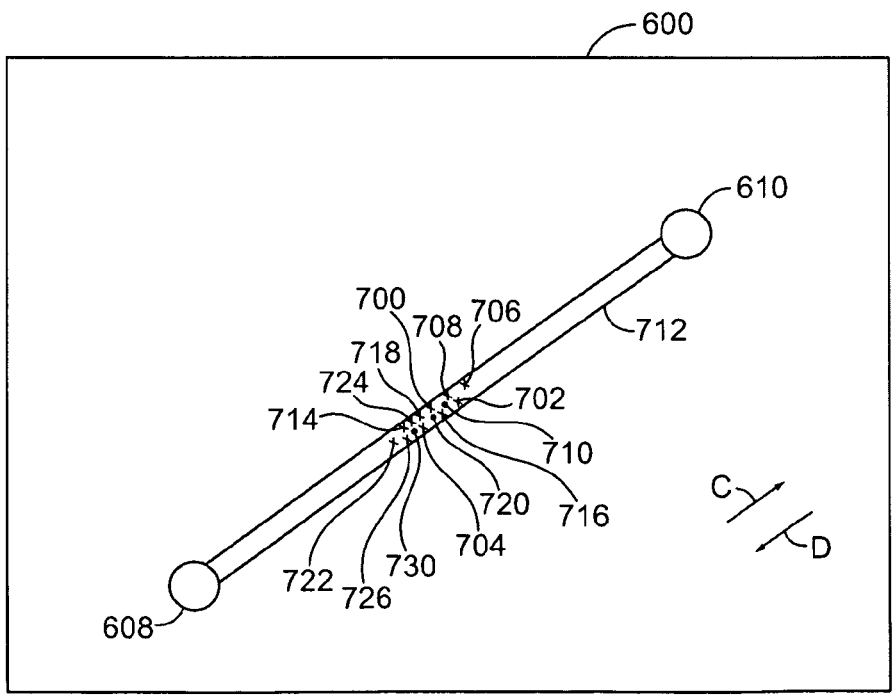
FIG. 7 illustrates the touchscreen of FIG. 6 and the detection of the movement of two touches with respect to each other in accordance with an embodiment of the present invention.

The controller 138 may also identify that the touches are both moving in or out with respect to each other based on the X and Y bias load resistances and by tracking the apparent touch coordinates. These gestures may occur when the user is moving both fingers towards or away from each other. FIG. 7 illustrates the touchscreen 600 and the touches at coordinate locations 608 and 610. The controller 138 may detect apparent touch coordinates 700, 702, 704, 706 and 708, each indicated with "x" symbol, that vary around a central coordinate location 710, indicated by a dot. In one embodiment, the central coordinate location 710 may be determined as an average coordinate location based on a predetermined number of consecutive apparent touch coordinates. The apparent touch coordinates 700-708 also vary along line segment 712.

In one embodiment, if the apparent touch coordinates 700-708 jitter or vary over time along the same line segment 712 and vary over time with respect to the same central coordinate location 710 while the X and Y bias load resistances both continuously or nearly continuously increase over time, the touch at coordinate location 608 is moving in the direction of arrow C and the touch at coordinate location 610 is moving in the direction of arrow D. Therefore, both of the touches are moving and are moving closer to each other.

In another embodiment, if the apparent touch coordinates 700-708 vary over time along the same line segment 712 and vary over time with respect to the same central coordinate location 710 while the X and Y bias load resistances both continuously or nearly continuously decrease over time, the touch at coordinate location 608 is moving in the direction of arrow D and the touch at coordinate location 610 is moving in the direction of arrow C. Therefore, both of the touches are moving and are moving further apart from each other.

The controller 138 may further identify that only one of the touches is moving closer or further from the other touch based on the X and Y bias load resistances and by tracking the apparent touch coordinates. In this example, the user may move only one finger while holding the other finger in place. If the touch corresponding to the coordinate location 610 moves in the direction of arrow D while the touch corresponding to the coordinate location 608 remains at the same coordinate location, the apparent touch coordinates will jitter or vary along the same line segment 712. However, the apparent touch coordinates will vary around a central coordinate location that is moving closer to the coordinate location 608.

For example, apparent touch coordinates 700-708 may vary around the central coordinate location 710. As the touch at coordinate location 610 moves in the direction of arrow D, apparent touch coordinates 714, 716 and 718 are detected, which vary around central coordinate location 720 while still varying along the line segment 712. Over time, apparent touch coordinates 722, 724 and 726 are detected, which vary around central coordinate location 730. At the same time, the controller 138 will detect that the X and Y bias load resistances are both continuously or nearly continuously increasing.

In another embodiment, if the user is moving the touch corresponding to the coordinate location 610 in the direction of arrow C while holding the touch corresponding to the coordinate location 608 in the same place, the apparent touch coordinates will vary along the line segment 712 and will vary around a central coordinate location that is moving in the direction of the coordinate location 610. In this case, the controller 138 will detect that the X and Y bias load resistances are both continuously or nearly continuously decreasing.

Once the coordinate locations 608 and 610 of the touches are determined, it is desirable to prevent the coordinate locations 608 and 610 from moving around quickly based on changes in the contact resistance (which causes changes to the X and Y bias resistance values). However, the coordinate locations 608 and 610 may still need to be adjusted to reflect any movement of the actual touches along the coversheet 102.

For example, when one or both touches are moving, the general trend of movement of the touches is superposed or combined with the jitter or variance (e.g. random changes between consecutive apparent touch coordinates). The variance associated with the change in contact resistance is large when compared to the changes to the apparent touch coordinates that reflect movement of a touch or touches on the touchscreen 600. Therefore, the controller 138 may filter out changes to the coordinate locations 608 and 610 of the touches when the variance is larger than a threshold. In some embodiments, the filtering of changes that are larger than the threshold may be referred to as low-pass filtering. In one embodiment, the threshold may be measured in pixels, millimeters, micrometers, any arbitrarily scaled geometrical coordinate or distance, and the like. Accordingly, the controller 138 may prevent the coordinate locations 608 and 610 of the touches from being changed based on contact resistance changes, while still allowing the changes that are based on actual coordinate changes of the touches. The coordinate locations 608 and 610 of the touches thus reflect the movements along the touchscreen 600 made by the user and do not reflect changes in the pressure and/or contact area of the finger.

In some cases, the variance or scatter in the apparent touch coordinates analyzed at step 512 of FIG. 5 is dominated by contact-resistance noise. This is the case shown in FIG. 6 in which it is assumed that scatter of apparent touch coordinates 602, 604 and 606 is little affected by changes of position of touch coordinate locations 608 and 610 during steps 508 and 510. In contrast, in some applications in which fingers may move rapidly in arbitrary directions or in which contact-resistance noise may be relatively small, a significant or even dominant contribution of the apparent touch coordinate scatter may come from the systematic motion of fingers during steps 508 and 510. However, as explained below with respect to cases that experience the aforementioned motion, with appropriate algorithms, correct touch positions may be obtained from the scatter or variation of the apparent touch coordinates.

Figure 8:
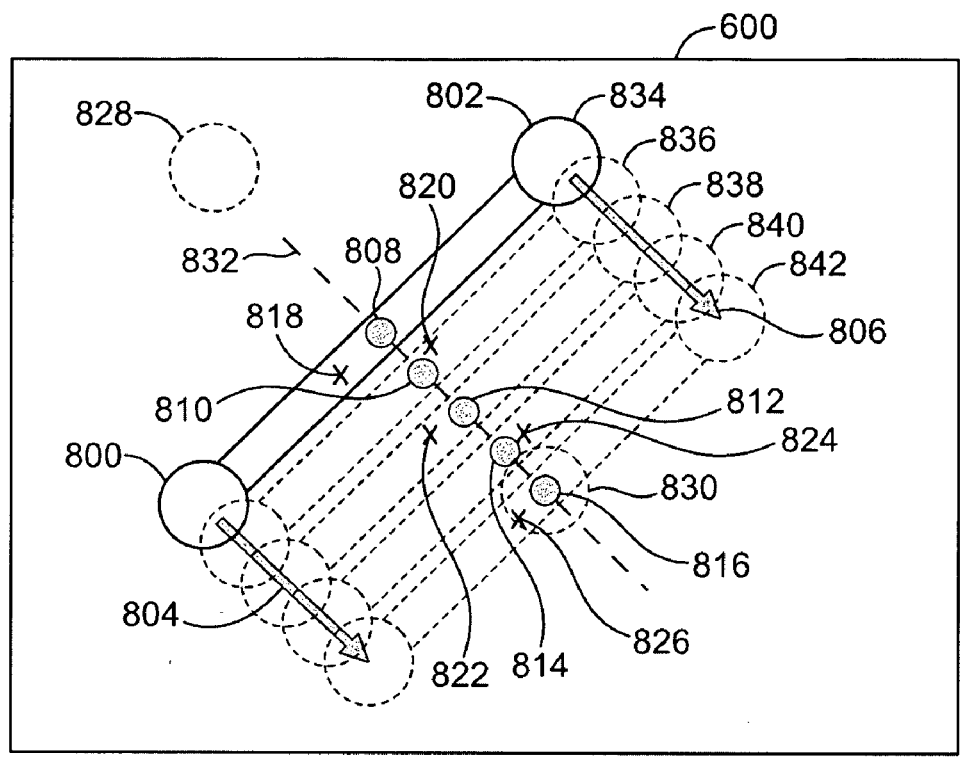
FIG. 8 illustrates a moving frame of reference reflecting movement of touches on the touchscreen in accordance with an embodiment of the present invention.

FIG. 8 illustrates an example wherein two simultaneous touches 800 and 802 on the touchscreen 600 are both rapidly moving in parallel at a 45 degree angle in right and downward directions 804 and 806. The translational motion is exemplary and an additional rotational component is contemplated. Centroids 808, 810, 812, 814, and 816 are shown as solid dots located at center points between the touches 800 and 802 and would represent the apparent touch coordinates if no contact resistance was present. However, because the contact resistance varies as discussed previously, measured apparent touch coordinates 818, 820, 822, 824 and 826 that have jitter or variance are detected.

Ghost touch positions 828 and 830, similar to the coordinate locations 312 and 314 discussed in FIG. 3, are also shown. In this example, the variance of the apparent touch coordinates 818-826 does not directly resolve the ambiguity and identify the actual touches 800 and 802, and thus supplementary moving-frame algorithm(s) may be used in addition to the algorithms and/or methods discussed previously.

A plurality of apparent touch coordinates are detected over time, such as the five apparent touch coordinates 818-826, although more or less coordinates may be used, such as three coordinates. The apparent touch coordinates 818-826 may be detected in the order of 818, followed by 820, followed by 822, and the like. Each of the apparent touch coordinates 818, 820, 822, 824 and 826 are detected within a frame 834, 836, 838, 840 and 842, respectively. Therefore, FIG. 8 illustrates the apparent touch coordinates 818-826 in a touchscreen frame of reference wherein the apparent touch coordinates 818-826 are actually located on the touchscreen 600 with respect to each other as shown.

Once the minimum number of apparent touch coordinates have been detected, the apparent touch coordinates 818-826 may be processed, such as by using a least-fit squares algorithm, to determine whether the apparent touch coordinates 818-826 may be fit to a straight line, such as line 832 that is shown on FIG. 8 as extending approximately through the centroids 808-816 (the centroids 808-816 are for reference only and are not directly measurable). The line 832 represents the general trend over time, while the variance of the apparent touch coordinates 818-826 about the line 832 represents noise.

The line 832 representing the general trend and the relationship of the apparent touch coordinates 818-826 to the line 832 may then be used to approximate parameters such as true center and displacement direction between the two touches 800 and 802 over time, which may then be used to define a moving frame. In other words, an approximate direction and speed of motion may be computed for each of the two touches 800 and 802.

Figure 9:
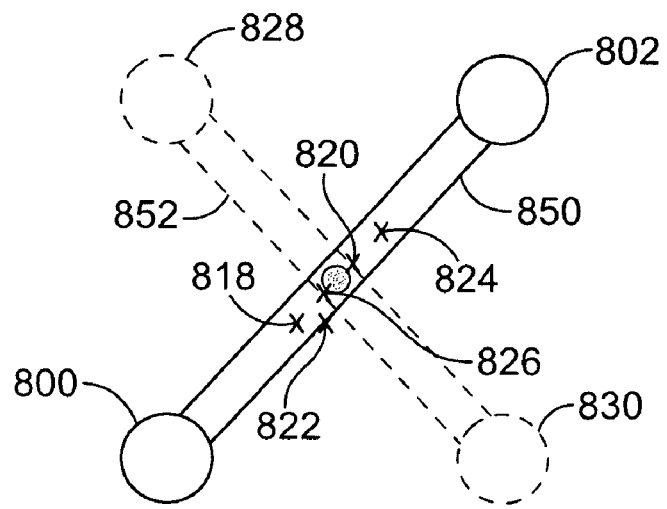
FIG. 9 illustrates a frame of reference that is moving with the touches of FIG. 8 in accordance with an embodiment of the present invention.

FIG. 9 illustrates how the apparent touch coordinates 818-826 appear from a frame of reference that is moving with the touches 800 and 802. The moving frame of reference in this example illustrates a compilation of the five frames 834, 836, 838, 840 and 842. FIG. 9 thus illustrates the scatter rather than the general trend of movement that is shown in FIG. 8. The variance or scatter is along a line segment 850 that extends between the touches 800 and 802. In contrast, if compared to the tolerance or width of line segment 852 that extends between ghost touch positions 828 and 830, the apparent touch coordinates 818-826 may be outside of the tolerance of the line 852 as discussed previously at 514 of FIG. 5. Therefore, if the scatter in the moving frame varies along the line segment 850 between the two touches 800 and 802, the moving-frame algorithm may resolve the ambiguity and determine which of the coordinate pairs represents the true touches. Accordingly, a moving frame of reference that comprises a plurality of frames, such as the frames 834-842 that move based on relative motion of the apparent touch coordinates 818-826, may be used to identify the coordinate locations of the two touches 800 and 802.

In another embodiment, the bias current may be used in addition to the apparent touch coordinates 818-826 to reconstruct the approximate locations of the two touches 800 and 802. This may result in the identification of a moving frame that is translating and, in some embodiments, may be rotating or simultaneously translating and rotating.

In another embodiment, changes in the variance over time may be used to resolve the ambiguity and identify the true touches, regardless of movement of the touches. As discussed previously, when the variance is larger than a predetermined threshold, the changes may be associated with changes in contact-resistance rather than coordinate changes of the touches. In other words, relatively slow changes, or low frequency changes, in bias currents may be due to gesturing or moving finger motions while relatively higher frequency fluctuations in the bias currents may be due to contact resistance fluctuations. In addition, high-pass filtered noise for bias current is correlated with high-pass filtered noise for measured X and Y voltages (e.g. raw touch (x, y) coordinate data) because both are caused by the same thing, the contact-resistance fluctuations.

Figure 10:
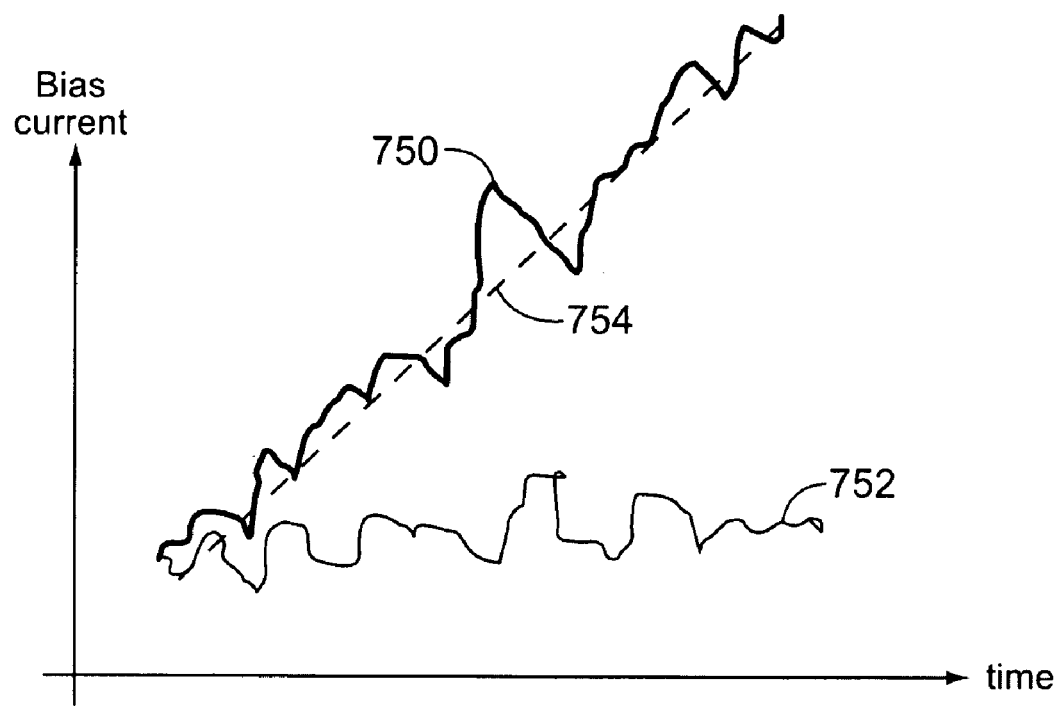
FIG. 10 illustrates high-pass filtered bias current data with respect to the raw detected bias current data in accordance with an embodiment of the present invention.

FIG. 10 illustrates an example of low and high-pass filtered bias current data with respect to the raw detected bias current data. In this example, bias current for one of X or Y is plotted over time. However, the following equally applies to detecting and plotting X and Y measured voltage coordinate data over time.

Raw data 750 indicates the bias current plotted over time. High-pass filtered data 752 indicates the result if the raw data 750 were passed through a high-pass filter, such that frequency fluctuations greater than the frequency threshold were identified. Low-pass filtered data 754 indicates the result if the raw data 750 were passed through a low-pass filter (e.g. frequency fluctuations below a frequency threshold, which may be based on information from the time domain, such as the length of time the data is collected at the time of processing) and then the data were fit to a line, such as by using a least squares method. Frequency filtering may be accomplished in the time domain using digital signal processing or filtering, such as a digital filter equivalent of an RC low-pass filter. In an alternative embodiment, at step 512 of FIG. 5, a least squares fit to raw data 750 is performed to determine low-pass filtered data 754. After the low-pass filtered data 754 is determined, the high-pass filtered data 752 may be determined as the difference between the raw data 750 and the low-pass filtered data 754.

The fluctuations in the high-pass filtered data 752 may be used to resolve the ambiguity as to which of the possible touch locations correspond to the actual touches. In the following equation, let $\Delta I^X(t_i)$ and $\Delta I^Y(t_i)$ be the high-pass filtered X and Y bias current data as a function of time $t_i$ and $\Delta X(t_i)$ and $\Delta Y(t_i)$ be the high-pass filtered measured coordinate data, or the X and Y voltages. The product of the four functions are summed over time:

$$S = \sum_i \Delta I^X(t_i) * \Delta I^Y(t_i) * \Delta X(t_i) * \Delta Y(t_i)$$

In one embodiment, ten samples of each of the voltages and bias currents may be detected over time, although it should be understood that more or less than ten samples may be used. For example, if the four-function correlation sum is positive, then one touch is larger in both X and Y coordinates than the other touch. If, however, the four-function correlation sum is negative, then one touch has a larger X coordinate and a smaller Y coordinate than the other touch. Therefore, the ambiguity when determining which of the four possible touch locations are the actual touches may be resolved.

The methods illustrated in FIGS. 5-10 also apply to 3-wire, 5-wire, 7-wire, 8-wire and 9-wire resistive touchscreen sensors. Therefore, the ambiguity experienced when two simultaneous touches are detected may be resolved by any of these touchscreen configurations as the touchscreens also have the capability of detecting apparent touch coordinates and tracking and measuring bias resistance values, bias current, voltages, and the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A resistive touchscreen system, comprising:
a coversheet comprising a first conductive coating;
a substrate comprising a second conductive coating, the substrate and the coversheet positioned proximate each other such that the first conductive coating faces the second conductive coating, the substrate and coversheet being electrically disconnected with respect to each other in the absence of a touch; and
a controller configured to (a) identify a multiple touch state when the substrate and coversheet are electrically connected with respect to each other at least two touch locations, (b) detect, over time, a plurality of apparent touch coordinates, (c1) identify two possible X coordinates and two possible Y coordinates associated with at least one of the apparent touch coordinates, (c2) determine when the apparent touch coordinates vary along a line segment, and (d) identify coordinate locations of two touches based on the line segment when the apparent touch coordinates vary along the line segment, and based on the two possible X coordinates and the two possible Y coordinates.

2. The system of claim 1, further comprising:
a first set of electrodes formed on the substrate and arranged to establish voltage gradients in a first direction; and
a second set of electrodes formed on the coversheet and arranged to establish voltage gradients in a second direction, the first and second directions being different.

3. The system of claim 1, wherein the controller is further configured to determine differences between the apparent touch coordinates and to discard the apparent touch coordinates when a portion of the differences between the apparent touch coordinates is greater than a threshold.

4. The system of claim 1, wherein the controller is further configured to detect X and Y bias load resistance values associated with the multiple touch state and to identify the two possible X coordinates and the two possible Y coordinates based on the X and Y bias load resistance values and the apparent touch coordinates.

5. The system of claim 1, wherein the controller is further configured to determine a slope of the line segment and to identify one of a clockwise and a counter-clockwise rotation movement when the slope of the line segment changes over time.

6. The system of claim 1, wherein the controller is further configured to detect, over time, X and Y bias load resistance values associated with the multiple touch state and to identify one of a clockwise and a counter-clockwise rotation movement when one of the X and Y bias load resistance values decreases while the other increases.

7. The system of claim 1, wherein the controller is further configured to detect X and Y bias load resistance values associated with the multiple touch state, and wherein the controller is further configured to identify that the two touches are one of moving closer together and moving further apart when the apparent touch coordinates vary over time with respect to a central coordinate location and the X and Y bias load resistance values are both increasing or decreasing over time.

8. The system of claim 1, wherein the controller is further configured to detect, over time, X and Y bias currents associated with the multiple touch state and X and Y voltages associated with the multiple touch state, wherein the controller is further configured to high-pass filter the X and Y bias currents and the X and Y voltages, and wherein the controller is further configured to identify the coordinate locations of the two touches based on the high-pass filtered X and Y bias currents and the high-pass filtered X and Y voltages.

9. The system of claim 1, wherein the controller is further configured to determine a moving frame of reference comprising a plurality of frames that move based on relative motion of the apparent touch coordinates, and wherein the controller is further configured to identify the coordinate locations of the two touches based on the moving frame of reference.

10. A method for identifying coordinate locations of two touches on a resistive touchscreen system, comprising:
   identifying a multiple touch state on a touchscreen based on a decrease in at least one of X and Y bias load resistance values;
   identifying at least N consecutive apparent touch coordinates;
   determining when the at least N consecutive apparent touch coordinates vary along a line segment; and
   identifying coordinate locations of two touches that lie along the line segment, the coordinate locations based on the X and Y bias load resistance values and the line segment when the apparent touch coordinates vary along the line segment.

11. The method of claim 10, further comprising:
   comparing coordinate differences between consecutive ones of the at least N consecutive apparent touch coordinates to a threshold; and
   discarding consecutive apparent touch coordinates that have coordinate differences that are greater than the threshold.

12. The method of claim 10, wherein N is at least three.

13. The method of claim 10, further comprising identifying two possible X coordinates and two possible Y coordinates based on the X and Y bias load resistance values and at least one of the apparent touch coordinates, the coordinate locations of the two touches being further based on the two possible X coordinates and the two possible Y coordinates.

14. The method of claim 10, further comprising:
   determining a slope of the line segment; and
   identifying one of a clockwise and a counter-clockwise rotation gesture when the slope of the line segment changes over time and one of the consecutively detected X and Y bias load resistance values decreases over time while the other increases over time.

15. The method of claim 10, further comprising displaying an indication at locations corresponding to each of the two touches.

16. The method of claim 10, further comprising reporting the coordinate locations of the two touches.

17. The method of claim 10, the method further comprising:
   determining that a portion of the at least N consecutive apparent touch coordinates lies outside the line segment; and
   identifying that more than two touch points are present.

18. The method of claim 10, further comprising:
   determining that at least one of the two touches is moving when both of the X and Y bias load resistance values either increase or decrease over time;
   determining that the at least N consecutive apparent touch coordinates vary with respect to a central coordinate location that is moving towards one of the two touches over time; and
   identifying that one of the two touches is moving towards the other touch in the direction of the movement of the central coordinate location.

19. The method of claim 10, further comprising:
   comparing coordinate differences between consecutive ones of the at least N consecutive apparent touch coordinates to a threshold; and
   adjusting the coordinate locations of the two touches based on the apparent touch coordinates that have the coordinate differences that are less than the threshold.

* * * * *